May 1, 1934. O. L. BEARDSLEY 1,956,557
GUN CARRIAGE
Filed April 29, 1933 2 Sheets-Sheet 1
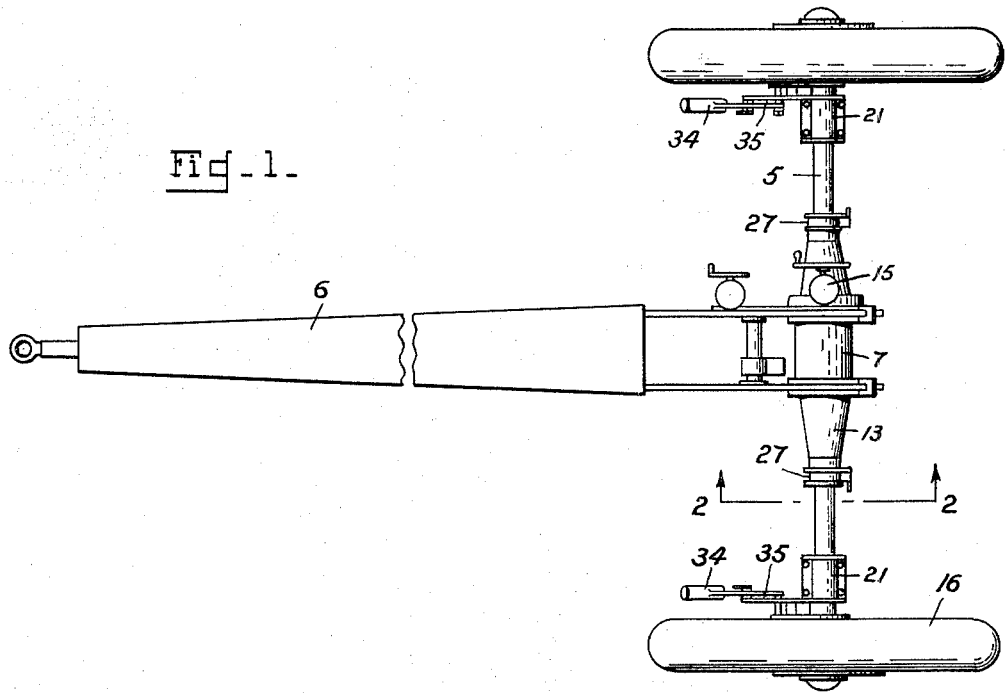
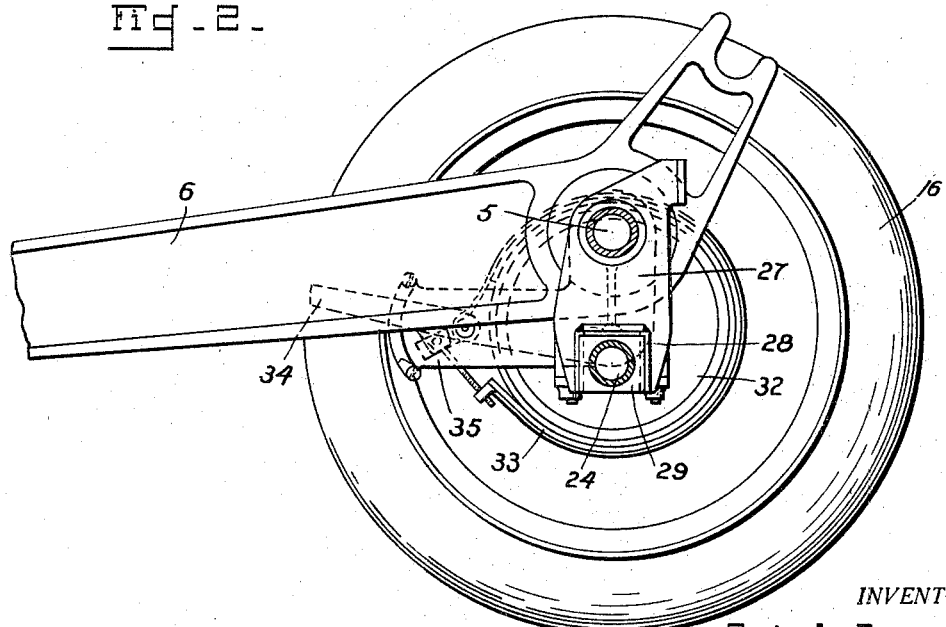
INVENTOR.
Orie L. Beardsley
BY W. N. Roach
ATTORNEY May 1, 1934.  O. L. BEARDSLEY  1,956,557
GUN CARRIAGE
Filed April 29, 1933   2 Sheets-Sheet 2
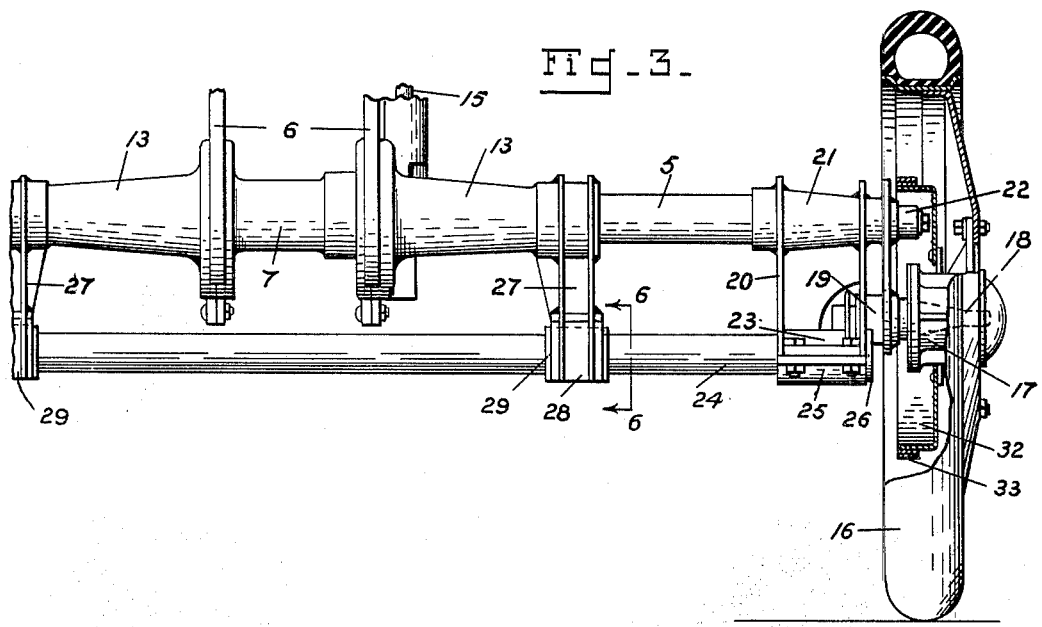
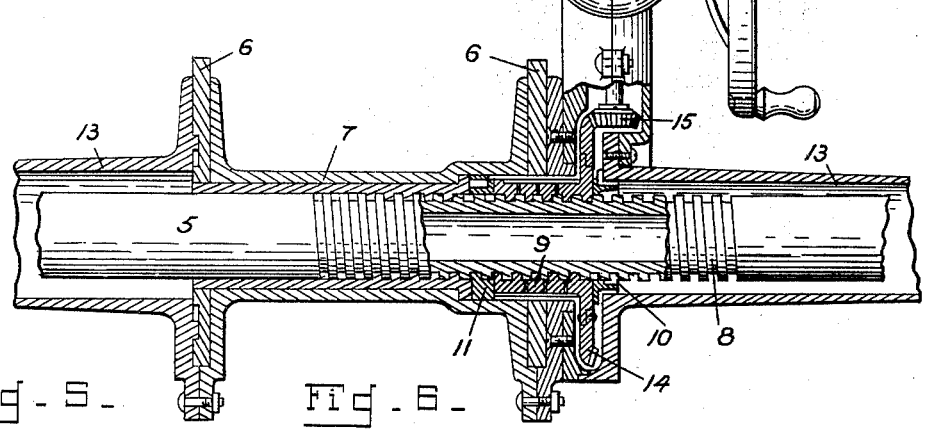
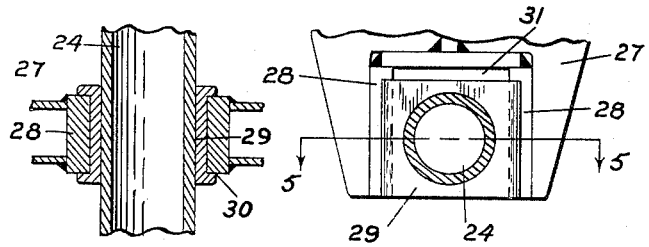
INVENTOR.
Orie L. Beardsley
BY W. N. Roach
ATTORNEY Patented May 1, 1934

1,956,557

UNITED STATES PATENT OFFICE 1,956,557

GUN CARRIAGE

Orie L. Beardsley, Gary, Ind.

Application April 29, 1933, Serial No. 668,537

4 Claims. (Cl. 89—40)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a gun carriage.

The purpose of the invention is to provide a gun carriage wherein a crank axle mounting a trail for traversing movement is braced against turning. The invention finds particular application in modifying existing gun carriages by replacing the wheels with wheels of smaller diameter.

To these and other ends, the invention consists in the construction, arrangement and combination of elements described hereinafter and pointed out in the claims forming a part of this specification.

A practical embodiment of the invention is illustrated in the accompanying drawings, wherein:

Fig. 1 is a plan view of the gun carriage.

Fig. 2 is a view taken on the line 2—2 of Fig. 1.

Fig. 3 is a view in front elevation of a portion of the carriage with a wheel shown partly in section.

Fig. 4 is a sectional view showing the traversing mechanism.

Fig. 5 is a sectional view on the line 5—5 of Fig. 6 and

Fig. 6 is a sectional view on the line 6—6 of Fig. 3.

Referring to the drawings by characters of reference, there is shown a gun carriage which is a modification of the existing 75 m/m gun carriage, French type. The carriage consists generally of an axle 5 on which a trail 6 is mounted through a bearing 7 for sliding movement. The axle is provided with threads 8 engaged by a nut 9 that is retained laterally relative to the trail by means by of thrust washers 10 and 11, the former seated on the inner end of one of the side brackets 13. By virtue of the lateral retention of the unit on the trail any rotation imparted to the nut will cause the trail to be moved across the axle. A gear wheel 14 on the nut is driven from actuating mechanism 15. All of the foregoing elements constitute the normal structure of the existing gun carriage and form no part of the present invention.

Instead of mounting the wheels 16 directly on the axle, they are of small diameter and each is mounted through a bearing 17 on a spindle 18 projecting from a socket 19 at the lower end of a depending crank arm 20. The crank arms are identical and each is mounted on an extremity of the axle 5 by means of a bearing 21 retained in place by a plug 22 attached to the end of the axle. The lower extremity of each crank arm terminates in a half bearing 23 in which a crossbeam, in the form of a tube 24, parallel to and below the axle, is retained by a cap plate 25. The tube 24 is held against lateral displacement relative to the crank arm by means of flanged ends 26 which may be integral with the tube or constituted by headed plugs.

The side brackets 13, movable transversely on the axle with the bearing 7 of the trail 6, are connected with the tube 24 by means of depending arms 27—27. Each arm is secured to a bracket by welding and has a bifurcated lower extremity with the fingers 28 straddling a bearing block 29 on the tube 24. As seen in Figs. 5 and 6 the fingers have a vertically sliding fit in opposite grooves 30 in the bearing block 29, but are laterally confined by said block so that the arm 27 and the block are movable as a unit horizontally relative to the axle. The purpose of the vertically sliding connection and the assembled clearance 31 between the top of the block and the arm is to prevent binding during movement of the traversing parts, especially when the tube 24 is out of parallelism with the axle.

Each of the wheels 16 carries a brake drum 32. A brake band 33 externally of the drum is applied thereto by means of a lever 34 mounted in a bracket 35 projecting rearwardly from the crank arm 19. The brakes are applied when the gun carriage is emplaced for firing.

I claim:

1. In a gun carriage, an axle, a crank arm mounted on each end of the axle, a socket on each crank arm, a spindle projecting from the socket, a wheel on the spindle, a trail mounted on the axle for traversing movement, side brackets on the trail and encircling the axle, a tube parallel to and below the axle and connecting the crank arms, a depending arm fixed on each side bracket, the lower end of the arm terminating in spaced fingers, a bearing block slidably mounted on the tube and having opposite grooves for receiving the fingers, the top of the block being normally spaced from the depending arm, a brake carried by each wheel, and a brake operating lever carried by each crank arm.

2. In a gun carriage, an axle, a crank arm mounted on each end of the axle, a socket on each crank arm, a spindle projecting from the socket, a wheel on the spindle, a trail mounted on the axle for traversing movement, side brackets on the trail and encircling the axle, a tube parallel to and below the axle and connecting the crank arms, a depending arm fixed on each side bracket, the lower end of the arm terminating in spaced fingers, a bearing block slidably mounted on the tube and having opposite grooves for receiving the fingers, the top of the block being normally spaced from the depending arm.

3. In a gun carriage, an axle, a crank arm mounted on each end of the axle, a socket on each crank arm, a spindle projecting from the socket, a wheel on the spindle, a trail mounted on the axle for traversing movement, side brackets on the trail and encircling the axle, a tube parallel to and below the axle and connecting the crank arms, a depending arm fixed on each side bracket, the lower end of the arm terminating in spaced fingers, a bearing block slidably mounted on the tube and having opposite grooves for receiving the fingers.

4. In a gun carriage, an axle, a crank arm mounted on each end of the axle, a wheel mounted on each crank arm, a trail mounted on the axle for traversing movement, side brackets on the trail and encircling the axle, a cross-beam parallel to and below the axle and connecting the crank arms, blocks slidable on the cross-beam, depending arms fixed to the side brackets and each having a vertically movable and horizontally immovable connection with one of the blocks, and a clearance with respect to the top of the block.

ORIE L. BEARDSLEY.